United States Patent [19]

Robbins

[11] Patent Number: 4,846,278
[45] Date of Patent: Jul. 11, 1989

[54] BOREHOLE PLUG AND METHOD

[75] Inventor: Geoffrey Robbins, Epping, Australia

[73] Assignees: Du Pont (Australia) Ltd., New South Wales; Mount Isa Mines Limited, Queensland; Specialised Polyurethane Applications Pty. Ltd., New South Wales, all of Australia

[21] Appl. No.: 54,326

[22] Filed: May 26, 1987

[30] Foreign Application Priority Data

May 21, 1986 [AU] Australia .............................. PH6122

[51] Int. Cl.$^4$ ............................................ E21B 33/13
[52] U.S. Cl. ...................................... 166/286; 166/63; 166/292; 166/300; 277/34; 102/333; 206/532; 156/305
[58] Field of Search ................. 166/285, 286, 299, 63, 166/179, 187, 192, 195, 300, 387, 292; 277/3, 34; 102/304, 333; 206/219, 528, 532; 156/293, 295, 305

[56] References Cited

U.S. PATENT DOCUMENTS

| 3,134,437 | 5/1964 | Karpovich | 166/299 |
|---|---|---|---|
| 3,141,513 | 7/1964 | Davis | 166/300 |
| 3,310,615 | 3/1967 | Bender | 166/286 |
| 3,340,336 | 9/1967 | Bender | 166/286 |
| 3,417,824 | 12/1968 | VanPoollen | 166/285 |
| 3,666,597 | 5/1972 | Parnell | 156/305 |
| 3,723,215 | 3/1973 | Kessler | 156/293 |
| 3,756,389 | 9/1973 | Firth | 206/47 A |
| 3,809,224 | 5/1974 | Greenwood | 206/219 |
| 3,964,948 | 6/1976 | Busse | 156/295 |
| 4,153,156 | 5/1979 | Seemann et al. | 206/219 |
| 4,280,943 | 7/1981 | Bivens et al. | 206/29.2 |
| 4,519,866 | 5/1985 | Stol | 156/295 |
| 4,633,946 | 1/1987 | Jackson | 166/187 |
| 4,674,570 | 6/1987 | Jackson | 166/187 |

FOREIGN PATENT DOCUMENTS

| 403345 | 3/1964 | Australia . | |
|---|---|---|---|
| 471668 | 1/1973 | Australia . | |
| 481121 | 3/1976 | Australia . | |
| 502971 | 5/1978 | Australia . | |
| 504484 | 11/1978 | Australia . | |
| 56-16530 | 2/1981 | Japan . | |
| 56-62814 | 5/1981 | Japan . | |
| 0209367 | 1/1968 | U.S.S.R. | 102/333 |
| 1446007 | 8/1976 | United Kingdom . | |

Primary Examiner—Stephen J. Novosad
Assistant Examiner—Terry L. Melius
Attorney, Agent, or Firm—Robert R. Jackson

[57] ABSTRACT

An inflatable borehole plug is disclosed, the inflation of which is achieved by chemical reaction of two co-reagents disposed therein which results in evolution of a gas. The borehole plug can be dropped or lowered down a borehole to a preselected position since the extent of gas-producing chemical reaction is able to be delayed following initiation of mixing of co-reagents, by delay means in the borehole plug, for sufficient time to enable placement of the borehole plug.

19 Claims, 2 Drawing Sheets

BOREHOLE PLUG AND METHOD

TECHNICAL FIELD

The present invention relates to inflatable borehole plugs and to the fixing of such plugs in boreholes and placing explosives thereabout.

BACKGROUND ART

Where boreholes are drilled so that an explosive charge may be delivered to an underground earth structure, it is a problem in that water located at the lower regions of the borehole may prevent or inhibit detonation of the explosive. In an attempt to overcome this problem, waterproof explosives are used, however, such waterproof explosives are generally expensive in comparison to other explosives.

Where more than one explosive deposit is to be placed at spaced intervals in a borehole, it has been conventional to apply a column of concrete or the like to a portion of the borehole so that a subsequent explosive charge may be spaced at a distance from the bottom of the borehole. The application of concrete or the like to this region of the borehole is both time consuming and expensive. The placing of plugs at selected depths in a borehole is generally called decking. Presently known decking methods are costly and inefficient.

One example of a decking is a wooden or concrete disk having a cross section substantially corresponding with the bore-cross section and lowered by rope to the water surface. It has also been proposed to use as a decking a polyester resin which floats on the water and solidifies after about 45 minutes. More recently, it has been suggested to replace the decking with a gel explosive slurry which floats on the water layer. Each of the foregoing methods suffers disadvantages. Timber or concrete deckings are not sufficiently reliable while gel explosive decking systems are costly and not easily prepared. Polyester resin is difficult to emplace without contamination of detonating cord, bore wall, and/or the resin and is slow to set. There thus remains a need for a decking system that is inexpensive, quick, convenient and which provides a reliable barrier above the water.

International patent application WO86/00660 describes a borehole plug composed of two or more co-reagents which expand when mixed separately contained such that they can be mixed when so required and further contain in an outer container adapted to retain the co-reagents during mixing and being dimensioned for dropping or lowering down a borehole. The co-reagents are described therein as the components of a polyurethane foam. The reaction between such co-reagents can be exothermic, and thus can present a hazard in the placement of explosives. Unless the co-reagents are carefully controlled, the temperatures achieved during the reaction between them can be such as to prematurely detonate explosives in contact with the borehole plug. This is especially so, where the borehole plug forms around detonating cord in the borehole.

DESCRIPTION OF INVENTION

The present invention relates to an inflatable borehole plug, the inflation of which is achieved by a chemical reaction of two co-reagents disposed therein which results in evolution of a gas. As gases generally have lower heat capacities than solids, and as many gas-generating chemical reactions are endothermic, the borehole plugs of this invention are less likely to cause premature explosions.

The borehole plug of the present invention can be dropped or lowered down a borehole to a preselected position since the extent of gas-producing chemical reaction is able to be delayed following initiation of mixing of the co-reagents for sufficient time to enable placement of the borehole plug. If dropped down the borehole, the plug may inflate while falling until it reaches a size comparable to the diameter of the borehole at the preselected position, thereby locating the plug at that position. Thereafter, the plug further inflates at the preselected position and forms a decking plug at that position.

The invention therefore provides an inflatable borehole plug comprising a first co-reagent and at least one further co-reagent or reagents wherein a gas is generated on reaction of said first co-reagent with said further co-reagent or reagents, said first co-reagent and further co-reagent or reagents being contained in a manner such that said first co-reagent does not inadvertently mix with said further co-reagent or reagents but is capable of being mixed when so required, said first and further co-reagents being further contained in an outer container adapted to retain the co-reagents during mixing and reaction and being dimensioned for droping or lowering down a borehole, characterized in that said further co-reagent or reagents are separated from said first co-reagent by delay means adapted to provide a sufficient time interval between release of said first co-reagent and generation of gas to permit the plug to be dropped or lowered down a borehole to a preselected position.

The co-reagents can be any of many substances known to react together to form gases such as carbon dioxide, nitrogen, oxygen, $H_2$, $SO_2$, $SO_3$, $NH_3$, oxides of nitrogen, hydrocarbon gases, halocarbon gases and any other gas. Preferably an inert gas such as carbon dioxide or nitrogen is formed. The term "hydrocarbons" includes methane, ethane, acetylene, 1,3-butadiene, 1-butene, 2-butene, butane, propane and other like gases. Carbon dioxide and nitrogen are particularly preferred gases.

Generally, the first co-reagent will be a liquid and the second co-reagent or reagents will be solid.

Examples of the many suitable systems include those for generation of carbon dioxide such as an acid as the first co-reagent and a carbonate or bicarbonate in the form of powder or tablets, for example, as the further co-reagent or water as the first co-reagent and a solid carbonate or bicarbonate together with a solid acid as the further co-reagents. Suitable solid acids include, for example, citric acid and tartaric acid. Suitable nitrogen generating systems include those based on nitrosamines such as dinitrosopentamethylenetetramine. Suitable oxygen generating systems include those based on peroxides and superoxides. The acid is preferably contained in a polyethylene container or sachet(s). Alternatively the first co-reagent and/or the further co-reagent can be contained in spray packs which upon activation release the first co-reagent and/or the further co-reagent at a predetermined rate(s).

The outer container, as well as being dimensioned for dropping or lowering into a borehole should be gas-tight. Preferred outer containers are multi-layer plastics bags, for example, polyethylene/nylon-polyethylene multi-layer bags which have suitable strength and low gas permeability. It is preferred that the bags be able to withstand 20 to 25 psi internal pressure and to maintain that pressure for up to four weeks. Low gas permeability can also be achieved by the use of a polyester inner layer or metalised plastic film.

It is preferred that the container for the further co-reagents or reagents incorporates the delay means. For example, the container can be made of a cardboard tube with plastic end caps. Preferably the end caps are secured to the cardboard tube with staples. In the carbon dioxide generating system which is preferably employed in the invention, the cube contains a solid carbonate and has plastic end caps. Acid is able to diffuse through the cardboard and carbon dioxide is generated as soon as the acid contacts the carbonate. Pressure increases within the tube and the end caps are blown off allowing further contact between carbonate and acid to generate sufficient carbon dioxide to inflate the outer container.

In a preferred embodiment the acid diffuses through the tube in 4 to 5 minutes. This time can be speeded by shaking.

Alternatively, the further co-reagent or reagents may be contained in a plastic cylinder having its ends sealed with thin foil which is capable of being eroded by the first co-reagent. The delay being achieved while the first co-reagent erodes the foil before contact with the further co-reagent or reagents.

In another preferred embodiment of the invention, the cardboard tube will contain a solid acid such as citric acid and a solid carbonate such as sodium bicarbonate, the first co-reagent being water. The cardboard delays the contact between the solid acid and carbonate and the water. On contact with the water, one or both of the acid or carbonate disolves allowing the reaction which generates carbon dioxide to proceed.

In a most preferred embodiment of the invention, the outer container is contained within a further outer bag which acts as an abrasion and puncture barrier. Such an outer bag, may be, for example, a thick walled polyethylene bag.

In a more preferred embodiment of the invention, the co-reagents and their respective containers and delay means are held within an inner reaction bag which is able to keep the first co-reagent in close contact with the container of the further co-reagent or reagents. Suitably, the inner reaction bag can be made of plastic such as polyethylene or polypropolene and it preferably has at least one small pin hole which allows the generated gas to escape to the outer container but does not permit rapid leakage of the liquid first co-reagent.

In a further embodiment the invention provides a method of placing a borehole plug in a borehole, which method comprises the steps of causing the first co-reagent of the borehole plug of the invention to commence diffusion towards the further co-reagent or reagents, lowering the plug down the borehole to the required position, allowing the co-reagent to mix with the further co-reagent or reagents so as to cause gas generation, allowing gas generation to continue within the borehole plug of the invention to form an inflated borehole plug firmly associated with and in contact with the borehole wall. Preferably the method further includes lowering an explosive down the borehole and placing the explosive on the inflated borehole plug.

BEST MODE OF CARRYING OUT THE INVENTION

Figure 1:
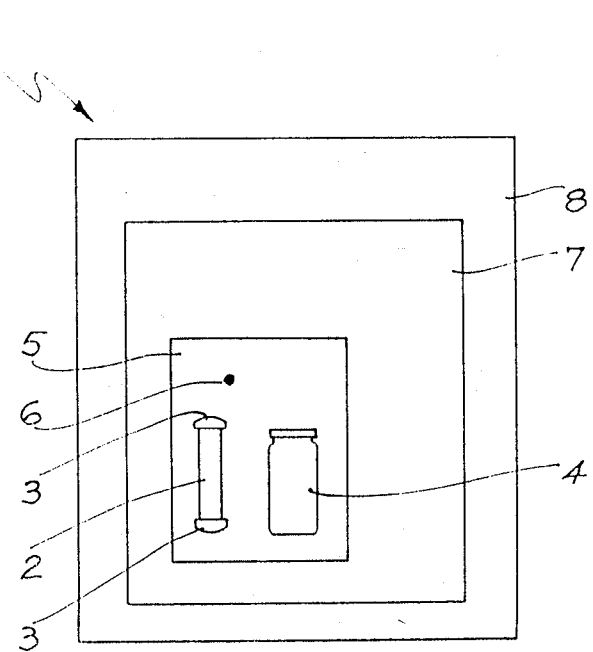
FIG. 1 is a schematic illustration of a preferred borehole plug according to the invention.

FIG. 1 illustrates a preferred borehole plug 1 according to the invention as it is before mixing of the co-reagents. Sodium carbonate is contained within a cardboard cylinder 2 with plastic end caps 3 which are secured to cylinder 2 by staples. Dilute hydrochloric acid is container within a plastic bottle 4. Containers 2 and 4 are sealed within inner reaction bag 5 made of polyethylene. Bag 5 has a pin hole 6 to allow for the escape of carbon dioxide when it is generated into a multi-layer pressure containment bag 7. Bag 7 is a polyethylene/nylon-polyethylene multi layer bag which has sufficient strength to retain the carbon dioxide generated and a sufficiently low gas permeability but it is able to withstand 20 to 25 psi internal pressure and maintain that pressure for at least 4 weeks. The bags are rolled rather than folded since folding can cause cracks at the corners of the folds which can result in gas leakage. The pressure containment bag 7 is sealed within outer bag 8 made of thick walled polypropylene. Bag 8 has an attachment point such as hole through which string, tape or wire can be passed. The attached string can be used to locate plug 1 at depth 12.

Figure 2:
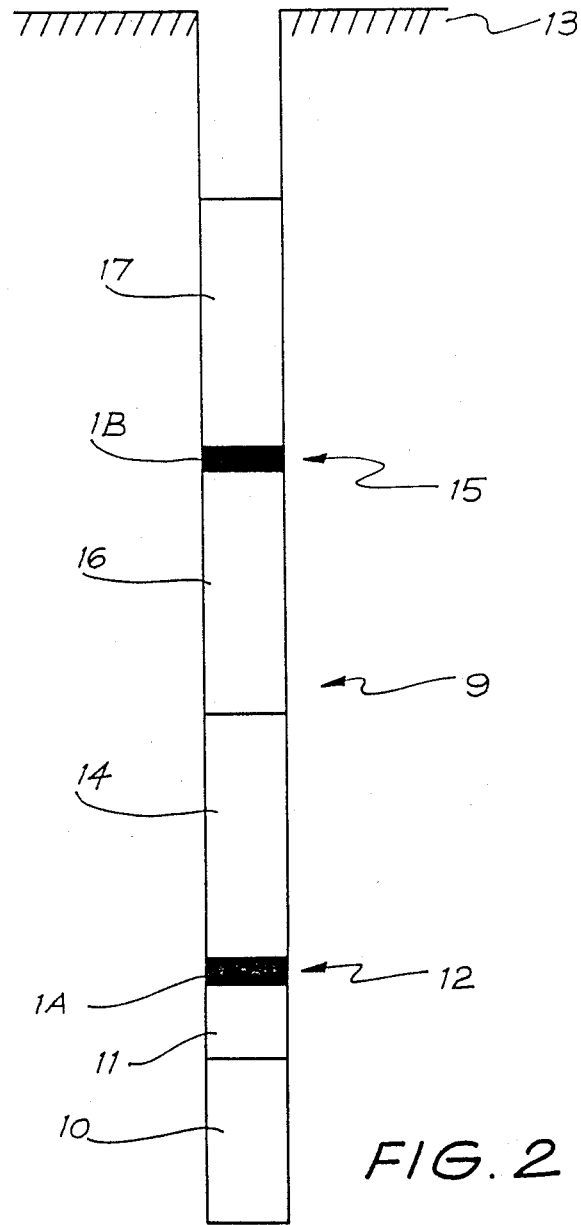
FIG. 2 is a schematic illustration of the use of a borehole plug according to the invention in a borehole.

In use, a borehole 9 (see FIG. 2) is drilled in ground to be blasted. Depending on the water table, such boreholes generally contain water. In such cases, waterproof explosive 10 is lowered to the bottom of the borehole 9. Such explosive is generally denser than water and any water 11 in the borehole is above the explosive 10.

The water is sealed in the borehole 9 by means of a plug 1A according to the invention. To place the plug 1A in the borehole 9, container 4 is ruptured permitting acid to enter the reaction bag 5. The plug 1A is then dropped down the borehole 9 where it comes to rest on top of the water 11. Acid diffuses through the cardboard tube 2 and begins to react with the sodium carbonate generating carbon dioxide gas which blows the end caps 3 from the tube 2 permitting more contact between the acid and bicarbonate. The carbon dioxide generated escapes through pin hole 6 and inflates the multi-layer pressure containment bag 7 within the outer bag 8.

There is thus provided a waterproof fixed barrier at depth 12 below the surface 13 in the borehole 9.

Further explosive 14 is lowered down the borehole 9 and comes to rest on the plug 1A at depth 12. A further plug 1B is prepared and lowered to depth 15 where it becomes firmly lodged against the walls of the borehole 9 leaving empty space 16 above explosive 14. Further explosive 17 is then lowered and it comes to rest on the plug 1B at depth 15. The borehole is thus prepared for blasting.

The construction sealing of the container should be such that when filled they satisfy the requirements of the relevant Regulatory Bodies regarding transport, storage and use.

Although any suitable container can be used for the acid, the preferred container is a blow moulded low density polyethylene jar with a clip-on or screw on lid. The acid can be released from the jar by the application of pressure, for example, from the heel of one's foot. This means that the acid can be released easily, even through several layers of encapsulating outer bags.

Preferably the polyethylene jar is contained in a plastic bag which contains leakage from the jar but which breaks open when the jar is squeezed so that its lid pops off.

The construction and materials used for the containers is such that even on rupturing, no sharp edges or points result which may puncture the encapsulating bags.

EXAMPLE 1

A borehole plug as illustrated in FIG. 1 is a self inflating bag in a range of sizes to seal boreholes from 150 mm to 400 mm in diameter. Inflation is caused by the reaction between a dilute acid (hydrochloric Acid) and a common foodstuff (Sodium Bicarbonate) producing Carbon Dioxide gas.

N.B. The acid is the same both chemically and in strength as the contents of human digestive juices.

To operate, the acid is released from its plastic container by pressure from the hands or the sole of ones foot. The packaging of the Bicarbonate delays the reaction and release of gas sufficiently to enable the placement of the borehole plug in the hole, unhindered.

The borehole plug assists Blast Engineers to enhance shot design and cut costs by reduction in his requirement for waterproof explosive. In many instances an inflated borehole plug of the invention may be used to prevent water entering the hole.

Basically in any circumstance where there are wet holes the borehole plug can be used to cut explosive costs. The borehole plug is simple and quick in operation and does not necessitate the need for any additional labour.

A non-explosive, non-hazardous product, the borehole plug is completely safe to use.

N.B. The reactants should not be cut from the enclosing package as the liquid will cause irritation to skin and eyes. In such an instance wash away with water.

TYPICAL USES (a) Capping a Borehole: A borehole plug of the invention can be used to cap a borehole. Advantageously this will keep the borehole when used at time of drilling or later if rain is forecast. Such capping (a) avoids use of waterproof explosives; (b) prevents water damage to Borehole; the borehole plug can be protected with drill cuttings and a channel can be scraped through the cuttings for drainage. When required the inflated borehole plug can be burst to load hole.

(b) Sealing Bottom of Hole: This can be achieved by placing the borehole plug at bottom of hole at time of drilling. Especially useful in areas known to make water from coal seam since it can prevent water from flowing into borehole.

(c) Slightly Wet Hole (0-2 m): In this arrangement an inflated borehole plug is positioned on top of water in the bottom of the borehole, ANFO is placed on top of the borehole plug and a stemming column is located on top of the ANFO column. Even with dewatering systems sufficient water remains to destroy at least 1 metre of Anfo column. The use of ANFO on top of an expanded borehole plug in a borehole shows large savings in explosives costs.

(d) Decking for Column Rise: In this arrangement a inflated borehole plug is positioned above an ANFO column in the borehole so as to provide an air column therebetween. A stemming column is located on top of the borehole plug. In some circumstances it is desirable to reduce the powder factor without lowering the height of the stemming column. In other circumstances it is desirable to reduce the size of the steaming column. On full inflation the borehole plug of the invention will support a column of stemming or ANFO for sufficient time to suit most blasting conditions.

(e) Pre Split: In this technique an explosive is placed at the bottom of a borehole and a borehole plug of the invention is placed near to the top of the borehole where it supports a small stemming column. This technique reduces the amount of airblast normally experienced with open boreholes. Some reduction in explosive requirement may also be achieved.

What I claim is:

1. A self-inflating device adapted to form a load-bearing, gas filled, borehole decking plug, said device comprising:

a substantially gas-impermeable inflatable outer container, dimensioned for dropping or lowering down a borehole, and containing reagents comprising a first reagent and at least one further reagent, said reagents being capable of reacting together to form a sufficient quantity of gas to inflate said device, wherein at least one of said reagents is releasably contained by containment means whereby said first reagent and said at least one further reagent are separated but can be brought together to react to form said gas, and wherein said containment means comprises a delay means adapted to provide a sufficient time interval between release of said first reagent or said at least one further reagent from said containment means and reaction of said reagents, to generate said gas to allow the device to be dropped or lowered down a borehole to a preselected position and to be inflated by said gas to form said decking plug at said preselected position.

2. The device according to claim 1, wherein said gas is selected from the group consisting of:
   carbon dioxide, nitrogen, oxygen, hydrogen, oxides of sulfur or nitrogen, ammonia, halocarbon gases, and hydrocarbon gases.

3. The device according to claim 1, wherein said first reagent is a solid and said at least one further reagent is a liquid.

4. The device according to claim 1, wherein said first reagent includes a carbonate or bicarbonate and said at least one further reagent is capable of liberating carbon dioxide therefrom.

5. The device according to claim 1, wherein said first reagent includes water and said at least one further reagent includes a solid carbonate or bicarbonate together with a solid acid.

6. The device according to claim 1, wherein said outer container is a multi-layer plastic bag.

7. The device according to claim 6, wherein said bag is able to withstand 20 to 25 psi internal pressure and able to maintain that pressure for up to 4 weeks.

8. The device according to claim 6, wherein said bag additionally comprises a polyester inner layer or metallised plastic film.

9. The device according to claim 1, wherein said at least one further reagent is contained by a containment means and said containment means incorporates the delay means.

10. The device according to claim 9, wherein said containment means is a plastic cylinder having its ends sealed with thin foil which is capable of being eroded by said first reagent.

11. The device according to claim 9, wherein said containment means is a cardboard tube having its ends sealed with end caps, said first reagent is a liquid, and said cardboard tube delays contact between said at least one further reagent and said liquid.

12. The device according to claim 9, wherein said containment means is a cardboard tube, said at least one further reagent comprises a solid acid and a solid carbonate, said first reagent is water, and said cardboard tube delays contact between said solid acid, carbonate and water.

13. The device according to claim 1, wherein said outer container is contained by an outer bag, said outer bag providing an abrasion and puncture barrier.

14. The device according to claim 1, wherein said first reagent, said at least one further reagent, their containment means and said delay means are contained within an inner reaction bag, said inner reaction bag being capable of closely contacting said first reagent with said containment means for said at least one further reagent.

15. A device according to claim 1, wherein said first reagent is a liquid and said at least one further reagent is a solid.

16. A method of locating a self-inflating device adapted to form a load-bearing, gas filled, borehole decking plug said device comprising:
   a substantially gas-impermeable inflatable outer container, dimensioned for dropping or lowering down a borehole, and adapted to contain reagents comprising a first reagent and at least one further reagent, said reagents being capable of reacting together to form a sufficient quantity of gas to inflate said device,
   wherein at least one of said reagents is releasably contained by containment means whereby said first reagent and said at least one further reagent are separated but can be brought together to react to form said gas,
   and wherein said containment means comprises a delay means adapted to provide sufficient time interval between release of said first reagent or said at least one further reagent from said containment means and reaction of said reagents, to generate said gas to allow the device to be lowered down a borehole to a preselected position and to be inflated by said gas to form a decking plug, in a borehole, which method comprises:
   causing said first reagent to be brought together with said at least one further reagent to commence forming said gas to inflate said device;
   lowering said device down said borehole to said preselected position; and
   maintaining said device at said preselected position until said device is inflated by said gas to form said decking plug at said preselected position.

17. The method according to claim 16 which method further comprises lowering an explosive down said borehole and placing said explosive on the inflated plug.

18. A method of locating a self-inflating device adapted to form a load-bearing gas filled borehole decking plug comprising:
   a substantially gas-impermeable inflatable outer container, dimensioned for dropping or lowering down a borehole, and adapted to contain reagents comprising a first reagent and at least one further reagent, said reagents being capable of reacting together to form a sufficient quantity of gas to inflate said device,
   wherein at least one of said reagents is releasably contained by containment means whereby said first reagent and said at least one further reagent are separated but can be brought together to react to form said gas,
   and wherein said containment means comprises a delay means adapted to provide sufficient time interval between release of said first reagent or said at least one further reagent from said containment means and reaction of said reagents, to generate said gas to allow the device to be dropped down a borehole to a preselected position and to be inflated by said gas to form a decking plug, in a borehole, which method comprises:
   lowering said device down said borehole to said preselected position;
   causing said first reagent to be brought together with said at least one further reagent to commence forming said gas to inflate said device; and
   maintaining said device at said preselected position until said device is inflated by said gas to form said decking plug at said preselected position.

19. A method of locating a self-inflating device adapted to form a load-bearing, gas filled, borehole decking plug, said device comprising:
   a substantially gas-impermeable inflatable outer container, dimensioned for dropping or lowering down a borehole, and adapted to contain reagents comprising a first reagent and at least one further reagent, said reagents being capable of reacting together to form a sufficient quantity of gas to inflate said device,
   wherein at least one of said reagents is releasably contained by containment means whereby said first reagent and said at least one further reagent are separated but can be brought together to react to form said gas,
   and wherein said containment means comprises a delay means adapted to release said first reagent or said at least one further reagent to generate said gas at a rate which allows the device to be dropped down a borehole so that said device falls under the force of gravity and said gas (i) inflates said device during said falling whereby the diameter of said device reaches a size comparable to the diameter of the borehole at a preselected position which causes said device to locate at the preselected position, and (ii) inflates said device at said preselected position to form said decking plug at said preselected position,
   said method comprising:
   causing said first reagent to be brought together with said at least one further reagent to commence forming said gas to inflate said device; and
   dropping said device down said borehole so that said device falls under the force of gravity and said gas
   (i) inflates said device during said falling whereby the diameter of said device reaches a size comparable to the diameter of the borehole at a preselected position which causes said device to locate at the preselected position, and
   (ii) inflates said device at said preselected position to form said decking plug at said preselected position.

* * * * *